UNITED STATES PATENT OFFICE.

AUGUSTE J. ROSSI AND LOUIS E. BARTON, OF NIAGARA FALLS, NEW YORK, ASSIGNORS TO THE TITANIUM ALLOY MANUFACTURING COMPANY, OF NEW YORK, N. Y., A CORPORATION OF MAINE.

TITANIC-OXID CONCENTRATE AND METHOD FOR PRODUCING THE SAME.

1,106,406. Specification of Letters Patent. Patented Aug. 11, 1914.

No Drawing. Application filed November 29, 1912. Serial No. 733,942.

*To all whom it may concern:*

Be it known that we, AUGUSTE J. ROSSI and LOUIS E. BARTON, both citizens of the United States, and residents of Niagara Falls, in the county of Niagara and State of New York, have invented a certain new and useful Titanic-Oxid Concentrate and Method for Producing the Same, of which the following is a specification.

Our present invention relates to titanic oxid ($TiO_2$) and methods for deriving the same from substances containing it and iron oxid, as for example titaniferous iron ores.

The objects of our invention comprise provision of methods for treating such substances on industrial scales, whereby the resulting products shall contain higher percentages of titanic oxid than have any heretofore naturally, or artificially produced, our said resulting titanic oxid product having also novel desirable characteristics, and being so producible more economically and readily than any other titanic oxid concentrates known to us.

Our method herein described as a comprehensive organized procedure comprises several steps which we believe to be individually novel and which are useful in modifications of our said method which omit some of the entire series of steps herein described as constituting said procedure.

We attain the said objects of our invention preferably as follows:—We first finely pulverize the ore, or substance, containing titanic oxid, and then melt it with admixed oxid of an alkali metal (preferably commercial caustic soda) and carbon, in some form, as, for example coke until the charge is thoroughly melted and iron oxids present reduced to elemental iron. The relative proportions of the said ingredients of the charge are preferably such as, determined by analysis of the particular ore, or substance, treated, to supply sufficient of such oxid of an alkali metal to combine with elements and compounds present having chemical affinity therefor, as for example with the titanic oxid to form titanate of soda ($Na_2TiO_3$) and to supply sufficient carbon to reduce the iron oxids present. But neither some deficiency, nor some excess is prohibitory. For example merely,—in treating an ore which analyzed

| | |
|---|---|
| Titanic oxid | 52 |
| Iron oxids | 40 |
| Silica | 3 |
| Alumina | 4 | we successfully proportioned the charge as follows, viz:—

| | | |
|---|---|---|
| Ore | 298 parts— | 59.6% |
| Soda (70%) | 172 parts— | 34.3% |
| Coke | 30 parts— | 6.0% |

The melting of the charge is preferably conducted in an electric furnace, but it may of course be accomplished by any other desired means capable of insuring a complete melt and reduction of iron oxid to elemental iron, as for example in an open hearth furnace heated by direct coke fire in a grate, or indirectly by producer gas, such furnaces being of course lined with material sufficiently refractory to resist the resulting reactions.

We believe that, during the melt, the following reactions, among others, occur in the charge, viz: Oxid of sodium combines with titanic oxid to form titanate of soda, thus readily breaking up ilmenite molecules if any present. Oxids of iron present are reduced to elemental iron. Oxids of iron, if any, remaining unreduced are maintained in ferrous state. Silica and alumina of the gangue combine with the oxid of sodium to form silicates and aluminates of soda. Care is taken to regulate the duration and temperature of the said smelting operation so as to retain in the resulting melt after its cooling, and homogeneously distributed therethrough, particles of elemental iron (usually in spongy form) resulting from the aforesaid reduction of the iron oxids. Said particles so located in intimate and uniformly distributed association with the titanium compounds of the melt are, by reason of their said distribution and condition, enabled to produce, at a later hereinafter described stage, results more rapidly and perfectly than through mere extraneous additions of iron or other metal. The melt being withdrawn from the furnace in any convenient manner is allowed to cool and then well crushed say to 80 mesh sieve. It is then repeatedly and thoroughly lixiviated in heated, preferably boiling, water, until substantially all the therein contained titanate of soda has been decomposed into titanic oxid and caustic soda. The soda thus set free, together with any excess soda and said silicates and aluminates, being soluble, dissolve, and are thus removed from the undissolved residue of the melt with the water of lixiviation. It will be noted that the soda lye resulting from said lixiviation can be evaporated to a cake of soda useful in treating as aforesaid the next charge of ore. In our practice we have thus repeatedly recuperated approximately 85%, or even more, of the soda employed, the which constitutes an important economy in the practice of our present method. What still remains of the melt after its aforesaid treatment may be expected to be substantially free from excess of soda, from silica and alumina and their compounds, and from most of the iron oxids, but to retain substantially all of the titanic oxid, and also, therewith intimately and homogeneously associated throughout, particles of elemental iron, and said small quantities of unreduced iron oxids, these latter being insoluble in water, together with some slight remainders of gangue, including magnesia, the said ores containing not to exceed traces of lime. It will be noted that the said unreduced iron oxids being as aforesaid in ferrous state are more soluble in the hereafter mentioned acid bath than if in ferric state. This last mentioned remainder of the melt we then subject, and preferably while still moist, to the action of a heated, preferably boiling, bath containing sulfuric acid. We prefer to proportion the sulfuric acid in quantity sufficient to insure the greatest possible solution of the titanic oxid present, say in practice a bath containing from 50% to 60% of sulfuric acid and the volume of the bath, relatively to the melt therein treated, being, of course, proportioned as by usual good practice, i. e. great enough to insure the aforesaid solution without undue excess of sulfuric acid. It will be noted that contact of the melt with our said bath results in imparting to the latter a blue or violet color. This is due to formation in the bath of titanous sulfate attributable to the reducing action of nascent hydrogen evolved from reaction of the aforesaid elemental iron particles present with sulfuric acid. Our said blue or violet bath is then withdrawn from its insoluble residues, as by decanting, being thus substantially freed from any solid impurities, and contaminations by unreduced and undissolved substances; but containing ferrous and titanous sulfates. We have discovered that in consequence of the novel conditions created in our said bath by our afore-said procedure we are enabled, by suitable precipitation to derive therefrom a novel substance, i. e. a basic titanic sulfate, i. e. a chemical combination of titanic sulfate with hydrated titanic acid. We have discovered that if to our said bath be added a very small amount, preferably about one half of one per cent. in volume of nitric acid and boiling it, precipitation of our said novel compound will be greatly accelerated, the concentration of our bath, at the time of such addition, being preferably reduced but not so far as to result in precipitation of previously known titanic acid products such as metatitanic acid. It will be understood that the nitric acid when thus added in such relatively minute quantity is incapable of oxidizing, unless negligibly, the titanous sulfate present to titanic sulfate as per the equation

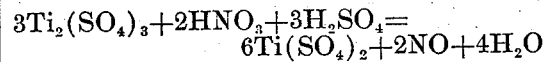

$$3Ti_2(SO_4)_3 + 2HNO_3 + 3H_2SO_4 = 6Ti(SO_4)_2 + 2NO + 4H_2O$$

and therefore the nitric acid does not itself act as the required precipitant of our process, but it seems merely to accelerate, or promote, the precipitation otherwise caused by the oxygen of the atmosphere. Precipitation occurs in our boiling bath independently of our addition of the nitric acid which, as employed by us, we believe to act merely as a catalytic agent greatly stimulating and accelerating the oxidation of the titanous sulfate as required for its precipitation as a basic sulfate. Repeated tests have demonstrated that precipitation of our composition by boiling only, requires from one and a half to two hours, whereas by addition of the said minute quantity of nitric acid to the boiling solution the precipitation occurs to the same extent in less than one half of that time. We have repeatedly produced our said novel composition, i. e. the said precipitate, by our above described method, and we find, by analysis, that, in practice, its constituents vary between certain definite limits substantially as follows:—

| | |
|---|---|
| Titanic oxid | 70 to 80% |
| Sulfuric anhydrid | 5 to 10% |
| Combined water | 15 to 20% |

We have claimed, in a herewith contemporaneously filed application for patent, our said composition as novel and as our invention. Our said novel composition, being the precipitate derived from our said bath as aforesaid, we then calcine, the resulting product containing a higher percentage of pure titanic oxid than hitherto obtainable in nature, or by any industrially practicable method of production, and also possessing other novel, superior and advantageous characteristics which render it exceptionally desirable for many uses. Our titanic oxid product thus produced is characterized as being in the form of an exceedingly pure and fine, amorphous, powder, nearly white or sometimes of a light yellow or buff shade, attributable probably to traces, or unimportant amounts of iron or its compounds; also as being, as compared to previous titanic oxid products, or concentrates, of a non-granular very soft and smooth texture, and of lower specific gravity, say 3.77 or not to exceed 3.80 as compared to the specific gravity 4.18 to 4.25 of pulverized natural rutile, or the specific gravity 3.99 of titanic oxid produced by calcination of what is known as meta-titanic, or ortho-titanic, acids. Such previously obtained titanic acids, for example those termed ortho-titanic acids, derived by aid of alkali precipitation of acid solutions being characterized as very hard, horny and dense masses; also the titanic oxids, such as "meta-titanic acids," derived from precipitation from acid solutions of titanium, such as titanium chlorid and titanium sulfate, diluted with water and boiled, being, when dried and calcined, in the form of coarse, gritty powder. An analysis of our titanic oxid powder resulting from calcination of our said precipitate has disclosed as its constituents—

Silica _____ 0.47%
Iron oxid
Alumina _____ 0.87%
Titanic oxid _____ 98.45% and we have often obtained, by our said method, final products containing higher percentages, i. e. above 99% of pure titanic oxid.

It will be understood that, as one of the aforesaid oxids of an alkaline metal, caustic potash may be employed in lieu of caustic soda, and in the same way as above described, but we prefer the latter, not only because of its comparatively lower cost, but also because of its superior efficiency under the conditions mentioned.

What we claim as new and desire to secure by Letters Patent is the following, viz:—

1. The method of obtaining titanic oxid (TiO$_2$) from a substance containing it and iron oxid, which comprises smelting said substance together with oxid of an alkali metal in presence of a reducing agent so as to produce titanate of said alkali metal and elemental iron in the resulting melt, lixiviating in heated water such melt containing elemental iron, subjecting the thereafter remaining melt to the action of a bath containing sulfuric acid, precipitating out of said bath the therein contained compounds of titanium, and withdrawing and calcining the resulting precipitate.

2. The method of obtaining titanic oxid (TiO$_2$) from a substance containing it and iron oxid, which comprises smelting said substance together with caustic soda in presence of a reducing agent so as to produce titanate of soda and elemental iron in the resulting melt, lixiviating in heated water such melt containing elemental iron, subjecting the thereafter remaining melt to the action of a bath containing sulfuric acid, precipitating out of said bath the therein contained compounds of titanium, and withdrawing and calcining the resulting precipitate.

3. The method of obtaining titanic oxid (TiO$_2$) from a substance containing it and iron oxid, which comprises smelting said substance together with oxid of an alkali metal in presence of a reducing agent so as to produce titanate of said alkali metal and elemental iron in the resulting melt, lixiviating in heated water such melt containing elemental iron, subjecting the thereafter remaining melt to the action of a bath containing sulfuric acid, boiling said bath with addition of nitric acid and withdrawing and calcining the resulting precipitate.

4. The method of obtaining titanic oxid (TiO$_2$) from a substance containing it and iron oxid, which comprises smelting said substance together with caustic soda in presence of a reducing agent so as to produce titanate of soda and elemental iron in the resulting melt, lixiviating in heated water such melt containing elemental iron, subjecting the thereafter remaining melt to the action of a bath containing sulfuric acid, boiling said bath with addition of nitric acid and withdrawing and calcining the resulting precipitate.

5. In obtaining titanic oxid (TiO$_2$) from a substance containing it and iron oxid, the steps which comprise smelting said substance together with oxid of an alkali metal in presence of a reducing agent until iron oxid is reduced to elemental iron, lixiviating in heated water the melt containing elemental iron and subjecting the undissolved residues to the action of a bath containing sulfuric acid sufficient to dissolve therein compounds of titanium.

6. In obtaining titanic oxid (TiO$_2$) from a substance containing it and iron oxid, the steps which comprise smelting said substance together with caustic soda in presence of a reducing agent until iron oxid is reduced to elemental iron, lixiviating in heated water the melt containing elemental iron and subjecting the undissolved residues to the action of a bath containing sulfuric acid sufficient to dissolve therein compounds of titanium.

7. In obtaining titanic oxid (TiO$_2$) from a substance containing it and iron oxid, the steps which comprise smelting said substance together with caustic soda in presence of carbon until iron oxid is reduced to elemental iron, lixiviating in heated water the melt containing elemental iron and subjecting the undissolved residues to the action of a bath containing sulfuric acid sufficient to dissolve therein compounds of titanium.

8. In obtaining titanic oxid (TiO$_2$) from a substance containing it and iron oxid, the steps which comprise smelting said substance together with oxid of an alkali metal in presence of carbon until iron oxid is reduced to elemental iron, lixiviating in heated water the melt containing elemental iron and subjecting the undissolved residues to the action of a bath containing sulfuric acid sufficient to dissolve therein compounds of titanium.

9. In obtaining titanic oxid (TiO$_2$) from a substance containing it and iron oxid, the steps which comprise smelting said substance together with oxid of an alkali metal in presence of a reducing agent until iron oxid is reduced to elemental iron, lixiviating in heated water the melt containing elemental iron, subjecting the undissolved residues to the action of a bath containing sulfuric acid sufficient to dissolve therein compounds of titanium, boiling said bath with nitric acid in quantity insufficient to oxidize all of its titanous sulfate to titanic sulfate, and calcining the resulting precipitate.

10. In obtaining titanic oxid (TiO$_2$) from a substance containing it and iron oxid, the steps which comprise smelting said substance together with caustic soda in presence of a reducing agent until iron oxid is reduced to elemental iron, lixiviating in heated water the melt containing elemental iron, subjecting the undissolved residues to the action of a bath containing sulfuric acid sufficient to dissolve therein compounds of titanium, boiling said bath with nitric acid in quantity insufficient to oxidize all therein titanous sulfate to titanic sulfate, and calcining the resulting precipitate.

11. In obtaining titanic oxid (TiO$_2$) from a substance containing it and iron oxid, the steps which comprise smelting said substance together with caustic soda in presence of carbon until iron oxid is reduced to elemental iron, lixiviating in heated water the melt containing elemental iron, subjecting the undissolved residues to the action of a bath containing sulfuric acid sufficient to dissolve therein compounds of titanium, boiling said bath with nitric acid in quantity insufficient to oxidize all therein titanous sulfate to titanic sulfate, and calcining the resulting precipitate.

12. In obtaining titanic oxid (TiO$_2$) from a substance containing it and iron oxid, the steps which comprise smelting said substance together with oxid of an alkali metal in presence of carbon until iron oxid is reduced to elemental iron, lixiviating in heated water the melt containing elemental iron, subjecting the undissolved residues to the action of a bath containing sulfuric acid sufficient to dissolve therein compounds of titanium, boiling said bath with nitric acid in quantity insufficient to oxidize all therein titanous sulfate to titanic sulfate, and calcining the resulting precipitate.

13. In obtaining titanic oxid (TiO$_2$) from a substance containing it and iron oxid, the steps which comprise smelting said substance in presence of a reducing agent, dissolving in part the resulting melt in a bath containing sulfuric acid sufficient to dissolve therein compounds of titanium, boiling said bath with nitric acid in quantity insufficient to oxidize all therein titanous sulfate to titanic sulfate, and calcining the resulting precipitate.

14. In the treatment of a bath containing titanous sulfate in solution, the step which consists in boiling said bath with nitric acid in proportion such as to promote precipitation therein of basic titanic sulfate.

15. In obtaining titanic oxid (TiO$_2$) from a substance containing it and iron oxid the steps which comprise smelting said substance together with oxid of an alkali metal in presence of a reducing agent, subjecting the resulting melt to the action of a bath containing sulfuric acid sufficient to dissolve therein compounds of titanium, precipitating out of said bath the resulting compounds of titanium, and calcining the resulting precipitate.

16. In obtaining titanic oxid (TiO$_2$) from a substance containing it and iron oxid the steps which comprise smelting said substance together with oxid of an alkali metal in presence of a reducing agent, and subjecting the resulting melt to the action of a boiling bath containing both sulfuric acid sufficient to dissolve therein compounds of titanium, and also nitric acid in proportion such as to promote precipitation therein of basic titanic sulfate.

17. The process of obtaining titanic oxid (TiO$_2$) from a substance containing it and iron oxid, which comprises smelting said substance together with oxid of an alkali metal in presence of a reducing agent, subjecting the resulting melt to the action of a 50% to 60% sulfuric acid bath of volume proportioned to insure solution of the therein compounds of titanium, adding thereto nitric acid not to exceed 1% of its volume, reducing its concentration, and boiling it.

18. As a new article a titanic oxid concentrate characterized as being a calcined product in the form of a fine, amorphous, non-granular, soft, smooth, powder, nearly white or light yellow, or light buff, in color, as containing a preponderance of titanic oxid and also iron and other substances not to exceed 2%.

19. As a new article a titanic oxid concentrate characterized as being a calcined product in the form of a fine, amorphous, non-granular, soft, smooth, powder, nearly white or light yellow, or light buff, in color, as containing titanic oxid, not less than 98%, and also iron and other substances not to exceed 2%.

20. As a new article a titanic oxid concentrate characterized as being a calcined product, of specific gravity 3.77 to 3.80, in the form of a fine, amorphous, non-granular, soft, smooth, powder, nearly white or light yellow, or light buff, in color, as containing a preponderance of titanic oxid and also iron and other substances not to exceed 2%.

21. As a new article a titanic oxid concentrate characterized as being a calcined product, of specific gravity 3.77 to 3.80, in the form of a fine, amorphous, non-granular, soft, smooth, powder, nearly white or light yellow, or light buff, in color, as containing titanic oxid not less than 98%, and also iron and other substances not to exceed 2%.

AUGUSTE J. ROSSI.
LOUIS E. BARTON.

Witnesses:
WALTER D. EDMONDS,
PHILIP C. PECK.